United States Patent [19]

Hofer et al.

[11] 3,894,083

[45] July 8, 1975

[54] AMIDES

[75] Inventors: Kurt Hofer, Munchenstein, Basel-Land; Guenther Tscheulin, Riehen, Basel-Land; Anton Voykowitsch, Binningen, Basel-Land, all of Switzerland

[73] Assignee: Sandoz Ltd., Basel, Switzerland

[22] Filed: Sept. 14, 1973

[21] Appl. No.: 397,227

[30] Foreign Application Priority Data
Sept. 21, 1972 Switzerland.................. 13796/72
Oct. 4, 1972 Switzerland.................. 14472/72

[52] U.S. Cl....... 260/559 H; 260/429 R; 260/429.9; 260/438.1; 260/439 R; 260/470; 260/471 A; 260/519; 260/558 H; 260/566 B; 252/402; 252/403; 260/45.75 C; 260/45.75 N; 260/45.7 P; 260/45.9 UC; 260/45.9 R; 260/465 D

[51] Int. Cl......................................... C07c 103/30
[58] Field of Search.................. 260/465, 559

[56] References Cited
UNITED STATES PATENTS
3,780,103   12/1973   Knell.................................. 260/559

*Primary Examiner*—Harry I. Moatz
*Attorney, Agent, or Firm*—Gerald D. Sharkin; Richard E. Vila; Joseph J. Borovian

[57] ABSTRACT

The present invention relates to acyl hydrazone compounds of the formula

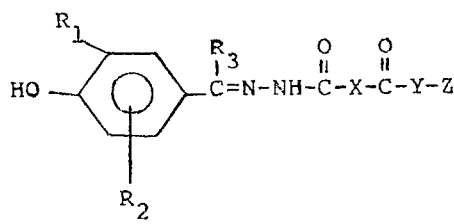

wherein
$R_1$, $R_2$, $R_3$ and Z are inter alia substituents and X and Y are inter alia bridging functions.

19 Claims, No Drawings

AMIDES

The present invention relates to acyl hydrazone compounds for use as antioxidants.

Accordingly, the present invention provides compounds of formula I,

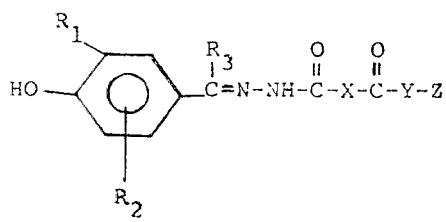

wherein
R₁ is tertiary alkyl (C₄-C₁₂), (c
R₂ is alkyl (C₁-C₂₀), cycloalkyl (C₅-C₁₂), cycloalkyl (C₅-C₁₁) alkyl (C₁-C₇), aralkyl (C₇-C₁₂), phenyl, or aralkyl (
₇-C₁₂) or phenyl mono-or di-substituted on the aromatic nucleus thereof by alkyl (C₁-C₆),
R₃ is hydrogen or alkyl (C₁-C₂₀),
X is a direct linkage, a 1,3-or a 1,4-phenylene,
Y is oxygen or -NH- and
Z is hydrogen; alkyl (C₁-C₂₂); cycloalkyl (C₅-C₁₂); cycloalkyl (C₅-C₁₁) alkyl (C₁-C₇); aralkyl (C₇-C₁₂); aryloxyalkyl (C₇-C₁₂); arylthioalkyl (C₇-C₁₂); aralkyl (C₇-C₁₂), aryloxyalkyl (C₇-C₁₂) or arylthioalkyl (C₇-C₁₂), monosubstituted on the aromatic nucleus thereof by alkyl (C₁-C₄) or alkoxy (C₁-C₄); phenyl; or phenyl mono-, di- or trisubstituted by 1, 2 or 3 of the groups alkyl (C₁-C₉), alkoxy (C₁-C₉), alkylthio (C₁-C₉) (with C₁-C₁₄ in the aggregate of the substituents alkyl, alkoxy and/or alkylthio), halogen, hydroxyl, cyano, COOR₄, phenoxy, phenyl or phenyl substituted by 1 or 2 alkyls (C₁-C₉) and/or by hydroxyl,
R₄ is hydrogen, alkyl (C₁-C₁₈), cycloalkyl (C₅-C₁₂), cycloalkyl (C₅-C₁₁) alkyl (C₁-C₇), aralkyl (C₇-C₁₂), phenyl or phenyl monosubstituted by hydroxyl and/or monoor di-substituted by alkyl (C₁-C₉);
and when
Z is alkyl, cycloalkylalkyl or substituted or unsubstituted aralkyl, aryloxyalkyl, arylthioalkyl or alkyl, alkoxy or alkylthio substituted phenyl, then any aliphatic alkyl chain thereof is either uninterrupted or is interrupted by 1 or 2 ether and/or thioether linkages,
and when
Y is oxygen, then Z may also be nickel, zinc, manganese or copper.

It is to be understood that by the term "halogen" as used herein is meant fluorine, chlorine or bromine.

When any of R₁, R₂, R₃ or Z are or contain aliphatic alkyl, then unless otherwise indicated, such aliphatic alkyls of more than 2 carbon atoms may be branched or straight chain, primary or secondary alkyl, and aliphatic alkyl of more than 3 carbon atoms may also be tertiary alkyl. Thus, examples of primary, secondary and tertiary aliphatic alkyl groups are the primary alkyl groups methyl, ethyl, n-propyl, n-butyl, n-pentyl and n-hexyl, the secondary alkyl groups isopropyl and 2-butyl and the tertiary alkyl groups tertiary butyl and 2-methyl-2-butyl.

Preferably R₁ is tertiary alkyl of 4 to 8, e.g. 4,5 or 6, carbon atoms especially tertiary butyl.

When R₂ is alkyl, this preferably of 1 to 12 carbon atoms, more preferably secondary or tertiary alkyl of 3 to 8 carbon atoms, e.g. of 4, 5 or 6 carbon atoms, particularly tertiary butyl.

When R₃ is alkyl, this is preferably of 1 to 12 carbon atoms, e.g. 1 to 11 carbon atoms.

When Z is alkyl, this is preferably of 1 to 18 carbon atoms, particularly of 1 to 12 carbon atoms.

When either of R₂ or Z is or contains cycloalkyl, e.g. cycloalkylalkyl, then examples are cyclopentyl, cyclohexyl, cycloheptyl and cyclododecyl. Preferably, cycloalkyl contains 5, 6 or 7 carbon atoms, e.g. cyclohexyl. Examples of cycloalkylalkyl groups are cyclohexylmethyl and 2-cyclohexylethyl.

When either of R₂ or Z is or contains aryl, e.g. aralkyl, this is preferably phenyl. Examples of aralkyl are phenylalkyls (C₇-C₁₂) such as benzyl and 2-phenylethyl.

When Z contains halogen, this is preferably chlorine or bromine, particularly chlorine.

Examples of groups embraced by Z are alkoxyalkyl such as methoxyethyl and 2-n-butoxyethyl, alkoxyphenyl such as 2-methoxyphenyl, 2,3-, 2,4-, 2,6- and 3,5-dimethoxyphenyl, alkoxyphenylalkyl such as 2-dimethoxyphenyl, phenoxyphenyl such as 2-methoxybenzyl, phenoxyphenyl such as 2-phenoxyphenyl, alkoxyphenoxyalkyl such as 4-ethoxyphenoxyethyl, alkoxyalkoxyphenyl such as 4-(2-ethoxyethoxy)phenyl, alkylthioalkyl such as 2-(dodecylthio)-ethyl and 2-(octadecylthio)propyl, phenylthioalkyl such as phenylthioethyl, alkylthioalkoxyalkyl such as 2-(2-methylthioethoxy)ethyl and halophenyl such as 2,6-dichlorophenyl.

A preferred group of compounds of formula I are the compounds of formula I$a$,

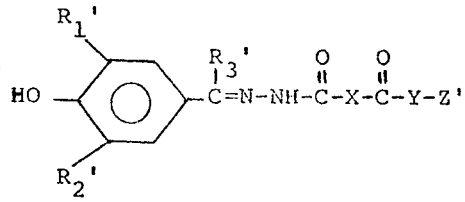

wherein
R₁' is tertiary alkyl (C₄-C₈),
R₂' is alkyl (C₁-C₁₂),
R₃' is hydrogen or alkyl (C₁-C₁₂),
X and Y are as defined above,
Z' is hydrogen; alkyl (C₁-C₁₈); phenyl; phenyl mono or disubstituted by 1 to 2 of the groups alkyl (C₁-C₉), alkoxy (C₁-C₉), alkylthio (C₁-C₉) (with C₁-C₉ in the aggregate of the substituents alkyl, alkoxy and/or alkylthio), phenyl, phenyl substituted by 1 or 2 alkyls (C₁-C₉) and/or by 1 hydroxyl, and -COOR₄'
wherein
R₄' is hydrogen, alkyl (C₁-C₉), phenyl or phenyl mono or disubstituted by alkyl (C₁-C₄);
and when
Y is oxygen,
then
Z' may also be nickel, zinc, manganese or copper.

A further preferred group of compounds are the compounds of formula I$b$,

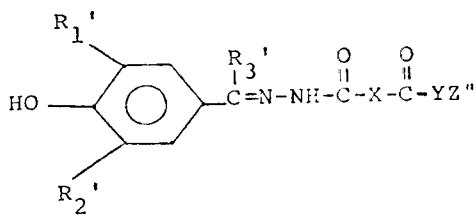

Ib wherein
$R_1'$, $R_2'$, $R_3'$, X and Y are as defined above, and
Z'' is hydrogen, alkyl ($C_1$-$C_{12}$), phenyl or phenyl mono- or disubstituted by 1 or 2 of the groups alkyl ($C_1$-$C_4$), alkoxy ($C_1$-$C_4$), alkylthio ($C_1$-$C_4$), hydroxyl and -COOR$_4''$,
wherein
$R_4''$ is alkyl ($C_1$-$C_4$),
and when
Y is oxygen,
then
Z may also be nickel, that is to say, the compounds of formula Ib'.

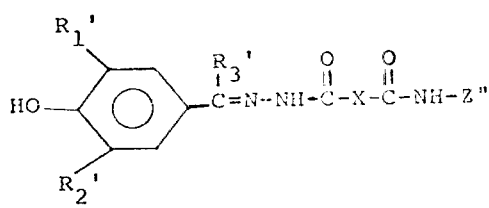

Ib' wherein
$R_1'$, $R_2'$, $R_3'$, X and Z' are as defined above,
and the compounds of formula Ib''.

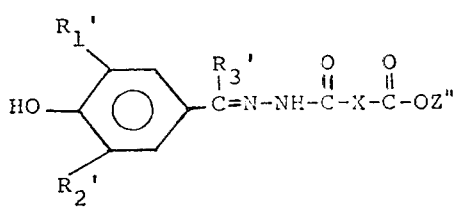

Ib'' wherein
$R_1'$, $R_2'$, $R_3'$, X and Z'' are as defined above, e.g. the compounds of formula Ic.

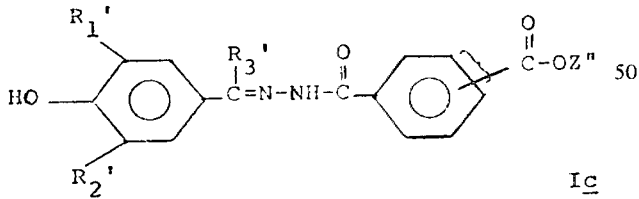

Ic wherein $R_1'$, $R_2'$, $R_3'$ and Z'' are as defined above, and the compounds of formula Id.

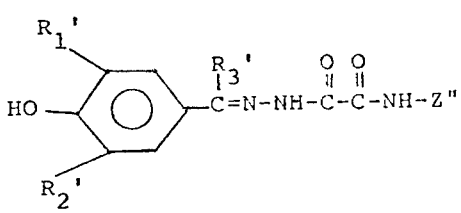

Id wherein $R_1'$, $R_2'$, $R_3'$ and Z'' are as defined above.

Particularly preferred compounds of the invention are the compounds of formulae I, Ia, Ib, Ib', Ib'', Ic and Id wherein $R_1$ and $R_2$, or as the case may be, $R_1'$ and $R_2'$, are each tertiary butyl.

Of special interest are the compounds of formulae I, Ia, Ib and Ib' wherein X is a direct linkage especially when Y is -NH-, e.g. the compounds of formula Id.

The present invention also provides a process for the production of a compound of formula I which comprises a. condensing a compound of formula II

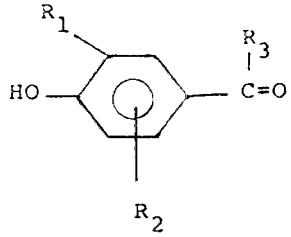

II wherein $R_1$, $R_2$ and $R_3$ are as defined above, with a compound of formula III

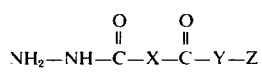

III wherein X, Y and Z are as defined above, or b) condensing a compound of formula IV,

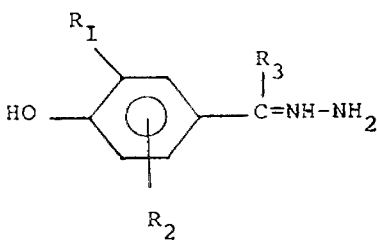

IV wherein $R_1$, $R_2$ and $R_3$ are as defined above, with a compound of formula V,

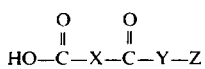

V wherein X, Y and Z are as defined above, or a reactive functional derivative thereof.

The process in accordance whith variant a) may be effected as follows:

The compounds of formulae II and III are preferably dissolved in a solvent such as an ether, e.g. a cyclic ether such as dioxane, and the reaction mixture heated to the boiling temperature, e.g. for a period of between 2 and 15 hours. In some cases, the reaction is advantageously effected in an inert atmosphere such as nitrogen. In addition, it may be advantageous to distill off the water eliminated during the reaction by means of a separator. The addition of catalysts such as glacial acetic acid or an acetic acid/sodium acetate mixture may generally be effected with advantage to increase the rate of reaction.

Working up is effected in conventional manner.

The process in accordance with variant b) may be effected as following viz.

The compound of formula V, preferably in the form of a reactive functional derivative thereof, e.g. ester or acid chloride, and the compound of formula IV are dissolved in a suitable solvent, such as an ether, e.g. dioxane, and the reaction allowed to proceed either at room temperature or at a slightly elevated temperature, e.g. between room temperature and 60°C. The reaction is acid catalysed and therefore the additon of, e.g. glacial acetic acid or p-toluenesulphonic acid, may serve to accelerate the reaction.

Working up is effected in conventional manner.

The compounds of formula III, employed as starting material in process a), may be produced by reacting a compound of formula V with hydrazine under analogous conditions to those described in relation to process variant b) above.

The compounds of formula IV, employed as starting material in process b), may be produced by reacting a compound of formula II with hydrazine under analogous conditions to those described in relation to process variant a) above.

The compounds of formulae II and V are either known or insofar as they are not known, they may be produced in analogous manner to the processes for producing the known compounds or in manner known per se.

The compounds of formula I posses antioxidant properties, i.e. they protect sensitive organic material from degradation under the effect of oxidation as indicated in the following test, viz, Test: Polypropylene, in powder form, is homogeneously mixed with 0.4 percent by weight of a compound of formula I, e.g. the compound of the formula

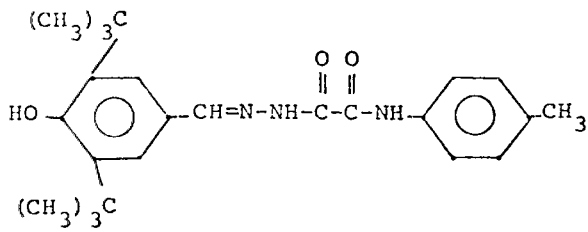

and the mixture kneaded for 5 minutes at 180°C on a roller mill. The mixture is then pressed into a sheet of 1 mm thickness. Small discs of 18 mm diameter are then punched out of the resulting sheet and are placed in an airtight chamber in an oxygen atmosphere. The system is heated to 190°C whereupon an excess oxygen pressure of 20 mm Hg is obtained. A fall in pressure indicates oxidation of the disc, a slow rate of pressure drop indicating high efficiency of the antioxidant. The time necessary for the excess pressure to drop to zero is measured and the results compared with an unstabilised control sheet tested under the same conditions.

The compounds of formula I are therefore useful in the stabilization of organic material, particularly plastics material, susceptible to oxidation, by a method which comprises treating the organic material with a compound of formula I.

It is to be understood that by the term "treating" is meant either surface coating the organic material with the compound of formula I, in the form of a film, or incorporating the compound of formula I into the body of the organic material, preferably the latter, in manner known per se.

The above method also forms part of the present invention. Thus, according to a first embodiment, the method may be effected by intimately mixing the antioxidant with a particulate form of, for example, a plastics material, such as polypropylene, e.g. polypropylene granules, in a kneader or other suitable device, to obtain uniform distribution of the antioxidant throughout the plastics material. The plastics material may thereafter be formed into final shape e.g. by extrusion or injection moulding. By such method, uniform distribution of the antioxidant throughout the body of the final material is achieved which is important for good protection.

According to a second embodiment, organic material in final form, for example, a textile filament, is passed through a dispersion of the antioxidant, e.g. in aqueous medium, to provide a protective coating of the antioxidant as a surface film on the organic material. Textile filaments or fabrics of polyethylene terephthalate or cellulose acetate are suited to this mode of application.

According to a third embodiment of the method of the present invention, particularly suited to stabilization of polymers or copolymers susceptible to degradation by oxidation, e.g. polypropylene, the antioxidant is mixed with the monomer or prepolymer before polymerisation or, as the case may be, copolymerisation, is effected, to yield the polymer or copolymer having the antioxidant uniformly distributed therethrough. The polymer or copolymer may thereafter be extruded, moulded or otherwise formed into final shape.

Examples of organic material susceptible to oxidation and embraced by the method of the present invention are cellulose derivatives, e.g. cellulose acetate, cellulose acetobutyrate, ethyl cellulose, cellulose nitrate and cellulose propionate, polyalkylenes, e.g. polyethylene and polypropylene, polyvinyl derivatives e.g. polyvinyl chloride, polyvinyl chloride acetate and polyvinyl alochol, polyamides, polyesters, polyacrylonitrile, polystyrene, silicon rubber, melamineformaldehye resins, urea-formaldehyde resins, allyl casting resins, polymethylmethacrylate, copolymers such as acrylonitrile - butadiene - styrene copolymers and natural products such as rubber, cellulose, wool and silk.

Stabilized organic materials according to the invention may exist in solid form, e.g. solid foams such as foam plastics, panels, rods, coatings, sheets such as paper, films, tapes, fibres, granules or powders, or in liquid form, e.g. solutions, emulsions or dispersions such as polishes, paints and creams.

The organic material may also be treated with other additives, e.g. heat and u.v. stabilizers. Other additives that may be mentioned are 2-hydroxybenzophenones, organic sulphur compounds, tin and trivalent phosphorus compounds nickel nicketl salts of carboxylic acids.

The amount of antioxidant employed in the method of the present invention will of course vary with the mode of application, the compound employed and the nature of the organic material to be treated.

Thus, for example, when the mode of application is the uniform distribution of the antioxidant throughout the body of the organic material, then in general, satisfactory results are obtained when the amount of antioxidant employed is between 0.01 and 5 percent, preferably between 0.05 and 1 percent of the weight of organic material to be treated.

Examples of the process of the invention will now be described. Where temperatures are referred to, these are in °C. Where parts and percentages are referred to, these are by weight.

EXAMPLE 1:

23.4 parts of 3,5-di-tertiary butyl-4-hydroxybenzaldehyde and 20.7 parts of oxal-2-(2'-ethylphenyl)-amide-1-hydrazide are dissolved in 100 parts of dioxane and 100 parts of glacial acetic acid and heated at reflux for 3 hours, after which the solvent is distilled off and the yellowish residue recrystallized from benzene/ethyl acetate. A white powder is obtained which melts at 195°–196°. The formula of the compound so produced is set out in Table 1 below.

EXAMPLE 2:

3.81 parts of oxal-2-(2'-ethylphenyl)-amide-1-hydrazide and 7.14 parts of 4-hydroxy-3,5butyl)-phenylundecyl butyl)phenylundercyl ketone are dissolved in 100 parts of xylene and heated at reflux for 14 hours under nitrogen, while the evaporating water is removed in a separator. The solution is then concentrated by evaporation in vacuum and the residue crystallized from methanol, which yields a faintly yellow powder with m.p. 125°–127°. The formula of the compound so produced is set out in Table 1 below.

EXAMPLE 3:

23.4 parts of 3,5-di-tert. butyl-4-hydroxybenzaldehye and 25 parts of oxal-2-(4'-methylphenyl)-amide-1-hydrazide are dissolved in 100 parts of dioxane and 100 parts of glacial acetic acid and heated at reflux for 3 hours. The solvent is then distilled off and the yellowish residue recrystallized from benzene/ethyl acetate, which yields a powder with m.p. 246°–247°C. The formula of the compound so produced is set out in Table 1 below.

TABLE 1

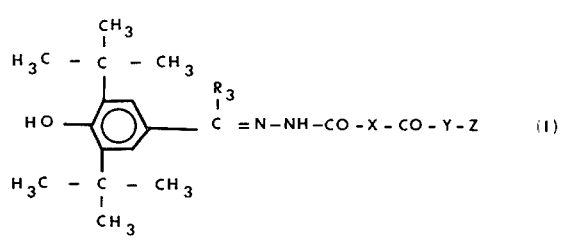

| Example No. | $R_3$ | —X—CO—Y—Z | |
|---|---|---|---|
| 1 | H | —CO—NH—⌬—$C_2H_5$ | |
| 2 | $C_{11}H_{23}(n)$ | do. | |
| 3 | H | Cl—⌬—CO—NH—⌬—$CH_3$ | |

In analogous manner to the processes described in Examples 1, 2 and 3, the compounds of Examples 4 to 14, set out in Table 2 below, are produced viz.

TABLE 2

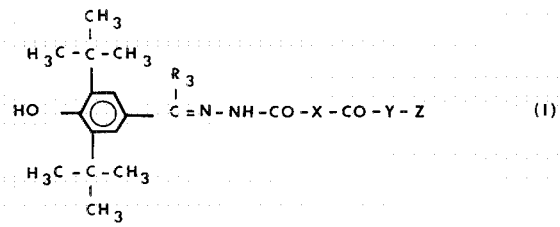

| Example No. | $R_3$ | —X—CO—Y—Z | m.p. |
|---|---|---|---|
| 4 | H | —⌬—$COOC_2H_5$ | 130–132° |
| 5 | H | —CO—NH—⌬—$OC_2H_5$ | 179–181° |
| 6 | $CH_3$ | do. | 176–178° |
| 7 | H | —CO—NH—$C_{12}H_{25}(n)$ | 160–162° |
| 8 | H | —C(O)—NH—⌬—S—$CH_3$ | 212–213° |
| 9 | H | —C(O)—NH—⌬—$OCH_3$ | 259–260° |
| 10 | H | —C(O)—NH—⌬($CH_3$)—OH | 279–280° |
| 11 | H | —C(O)—NH—⌬—OH | 300° |
| 12 | H | —C(O)—NH—⌬($CH_3$)($CH_3$) | 209–211° |
| 13 | H | —C(O)—NH—⌬—$CH(CH_3)_2$ | 197–198° |
| 14 | H | —C(O)—NH—⌬—$C_{12}H_{25}(n)$ | 166–167° |

What is claimed is:

1. A compound of the formula

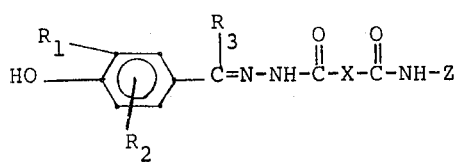

wherein
$R_1$ is tertiary alkyl ($C_4$-$C_{12}$),
$R_2$ is alkyl ($C_1$-$C_{20}$), cycloalkyl ($C_5$-$C_{12}$), cycloalkyl ($C_5$-$C_{11}$) alkyl ($C_1$-$C_7$), phenylalkyl ($C_7$-$C_{12}$), phenyl, or phenylalkyl ($C_7$-$C_{12}$) or phenyl mono- or disubstituted on the aromatic nucleus thereof by alkyl ($C_1$-$C_6$),
$R_3$ is hydrogen or alkyl ($C_1$-$C_{20}$),
X is a direct linkage, a 1,3-or a 1,4-phenylene,
Z is hydrogen ; alkyl ($C_1$-$C_{22}$); cycloalkyl ($C_5$-$C_{12}$); cycloalkyl ($C_5$-$C_{11}$) alkyl ($C_1$-$C_7$) phenylalkyl ($C_7$-$C_{12}$); phenoxyalkyl ($C_7$-$C_{12}$); phenylthioalkyl ($C_7$-$C_{12}$); phenylalkyl ($C_7$-$C_{12}$), phenoxyalkyl ($C_7$-$C_{12}$) or phenylthioalkyl ($C_7$-$C_{12}$), monosubstituted on the aromatic nucleus thereof by alkyl ($C_1$-$C_4$) or alkoxy ($C_1$-$C_4$); phenyl, or phenyl mono-, dior trisubstituted by any combination of the groups alkyl ($C_1$-$C_9$), alkoxy ($C_1$-$C_9$), alkylthio ($C_1$-$C_9$) (with $C_1$-$C_{14}$ in the aggregate of the substituents alkyl, alkoxy and/or alkylthio), halogen, hydroxyl, cyano, phenoxy, phenyl, phenyl substituted by 1 or 2 alkyls ($C_1$-$C_9$) and/or by hydroxy,
and when
Z is alkyl, cycloalkylalkyl or substituted or unsubstituted phenylalkyl, phenoxyalkyl, phenylthioalkyl or alkyl, alkoxy or alkylthio substituted phenyl, then any aliphatic alkyl chain thereof is either uninterrupted or is interrupted by 1 or 2 ether and/or thiother linkages.

2. A compound of claim 1 of the formula

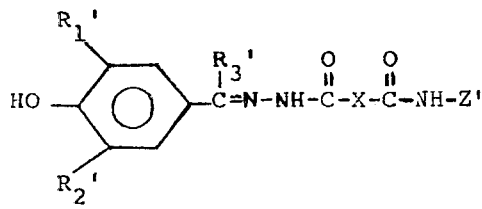

wherein
$R_1'$ is tertiary alkyl ($C_4$-$C_8$),
$R_2'$ is alkyl ($C_1$-$C_{12}$),
$R_3'$ is hydrogen or alkyl ($C_1$-$C_{12}$), Z' is hydrogen; alkyl ($C_1$-$C_{18}$); phenyl; phenyl mono or disubstituted by 1 or 2 of the groups alkyl ($C_1$-$C_9$), alkoxy ($C_1$-$C_9$), alkylthio ($C_1$-$C_9$) (with $C_1$-$C_9$ in the aggregate of the substituents alkyl, alkoxy and/or alkylthio), phenyl, phenyl substituted by 1 or 2 alkyls ($C_1$-$C_9$) and/or by 1 hydroxyl.

3. A compound of claim 1 of the formula

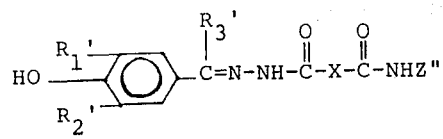

wherein
$R_1'$ is tertiary alkyl ($C_4$-$C_8$)
$R_2'$ is alkyl ($C_1$-$C_{12}$)
$R_3'$ is hydrogen or alkyl ($C_1$-$C_{12}$), and
Z'' is hydrogen, alkyl ($C_1$-$C_{12}$), phenyl or phenyl mono- or disubstituted by any combination of the groups alkyl ($C_1$-$C_4$), alkoxy ($C_1$-$C_4$), alkylthio ($C_1$-$C_4$) and hydroxyl.

4. A compound of claim 3 of the formula

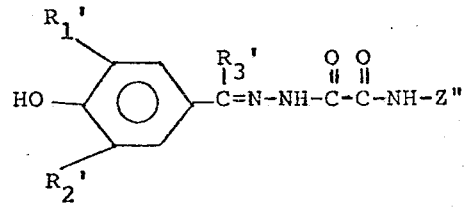

wherein
$R_1'$, $R_2'$, $R_3'$ and Z'' are as defined in

5. A compound of claim 1 wherein X is a direct linkage.

6. A compound of claim 2 wherein X is a direct linkage.

7. The compound of claim 4 of the formula

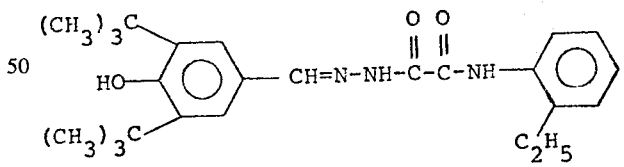

8. The compound of claim 4 of the formula

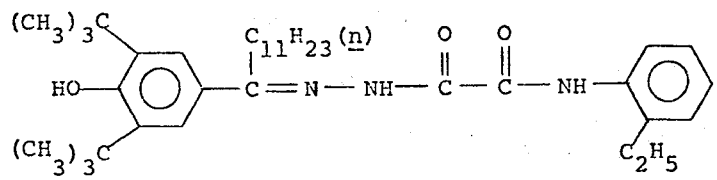

9. The compound of claim 4 of the formula

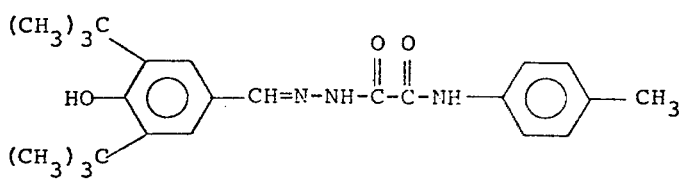

10. The compound of claim 4 of the formula

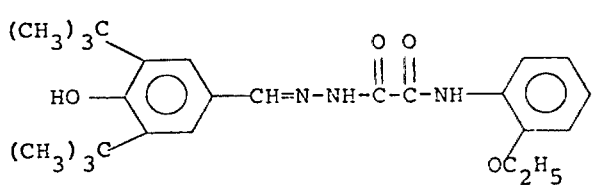

11. The compound of claim 4 of the formula

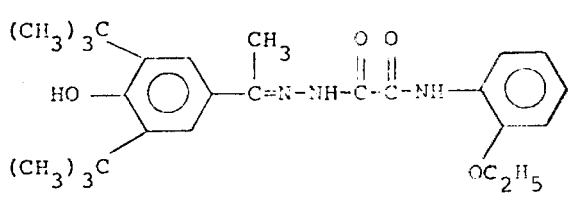

12. The compound of claim 4 of the formula

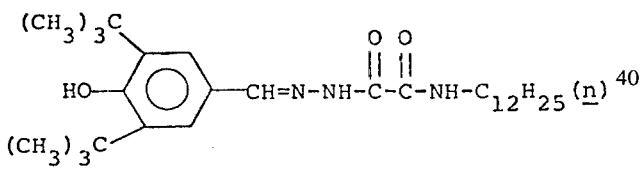

13. The compound of claim 4 of the formula

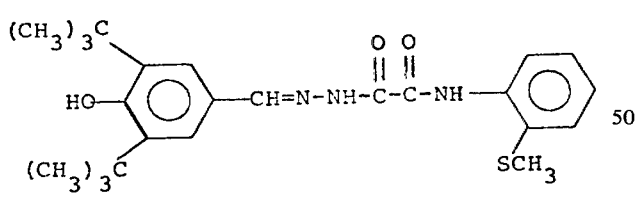

14. The compound of claim 4 of the formula

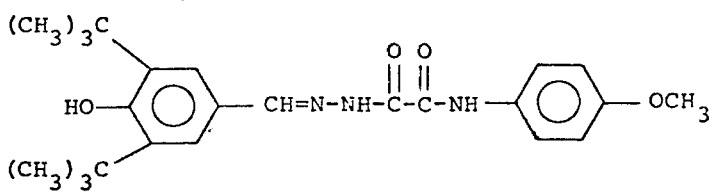

15. The compound of claim 4 of the formula

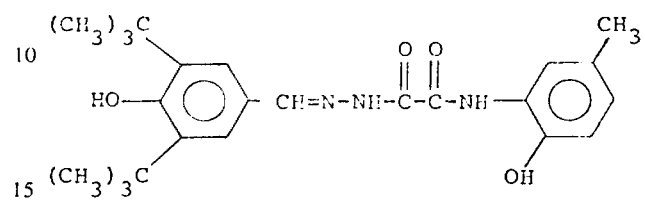

16. The compound of claim 4 of the formula

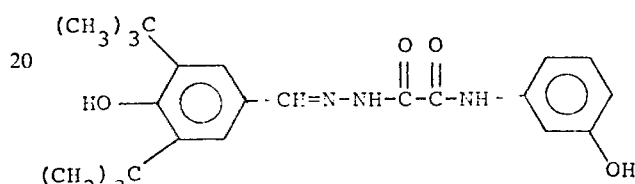

17. The compound of claim 4 of the formula

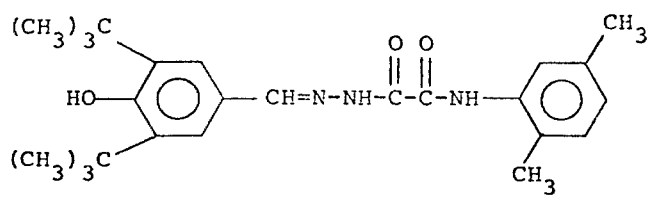

18. The compound of claim 4 of the formula

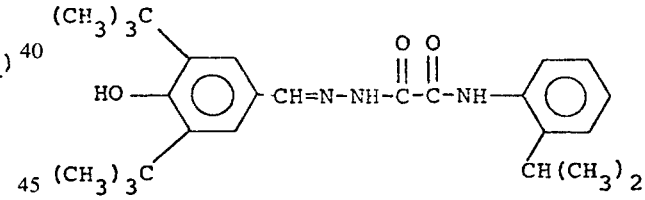

19. The compound of claim 4 of the formula

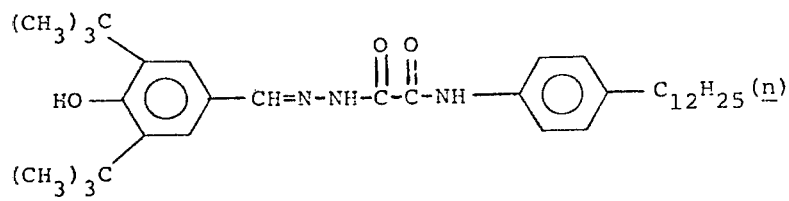

* * * * *